United States Patent [19]

Opfergelt

[11] Patent Number: 4,754,902
[45] Date of Patent: Jul. 5, 1988

[54] BEVERAGE CADDY FOR BICYCLES

[76] Inventor: Robert F. Opfergelt, 6011 Tenth St. E., Bradenton, Fla. 33578

[21] Appl. No.: 908,602

[22] Filed: Sep. 18, 1986

[51] Int. Cl.4 ............................................. B62J 7/06
[52] U.S. Cl. .................................. 224/41; 224/30 A; 224/148
[58] Field of Search ................. 224/148, 30 A, 36, 41, 224/39, 30 R, 240, 251, 42.45 R, 42.46 R, 273, 274; 280/289 A; D 6/514; 220/85 H

[56] References Cited

U.S. PATENT DOCUMENTS

| | | | |
|---|---|---|---|
| 344,152 | 6/1886 | Barker | 224/248 X |
| 1,288,190 | 12/1918 | Ravn | 220/85 H X |
| 2,757,698 | 8/1956 | Goodman | 224/248 X |
| 3,734,439 | 5/1973 | Wintz | 224/30 A X |
| 3,968,912 | 7/1976 | Horwitz | 224/36 |
| 4,071,175 | 1/1978 | Wagnon | 224/41 X |
| 4,256,281 | 3/1981 | Harris et al. | 224/30 A X |
| 4,312,465 | 1/1982 | Sinkhorn et al. | 224/36 |
| 4,386,721 | 6/1983 | Shimano | 224/30 R X |
| 4,437,596 | 3/1984 | Shook | 224/39 |
| 4,535,923 | 8/1985 | Manke | 224/42.45 R X |
| 4,570,835 | 2/1986 | Criqui et al. | 224/148 X |
| 4,629,153 | 12/1986 | Marcum | 224/42.45 R X |

Primary Examiner—Henry J. Recla
Assistant Examiner—Robert M. Petrik
Attorney, Agent, or Firm—Charles J. Prescott; Raymond H. Quist

[57] ABSTRACT

A beverage container caddy for bicycles has a rigid cage providing front and rear container restraints and a container support base. The cage is sized to hold an open beverage container (or the container with an insulating cover) in an upright position in front of the handle bars of the bicycle. The cage has an arcuate brace to which a T-shaped support is secured by intermediate members. At the ends of the arms of the "T" are provided curved links which can be secured about the handle bars.

13 Claims, 1 Drawing Sheet

U.S. Patent    Jul. 5, 1988    4,754,902
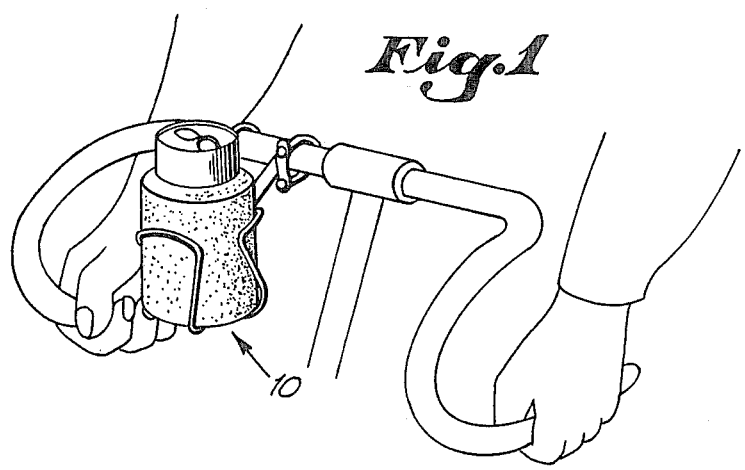
*Fig. 1*
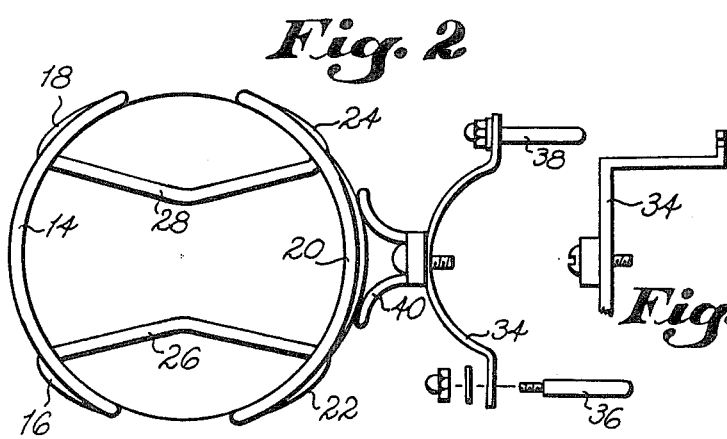
*Fig. 2*
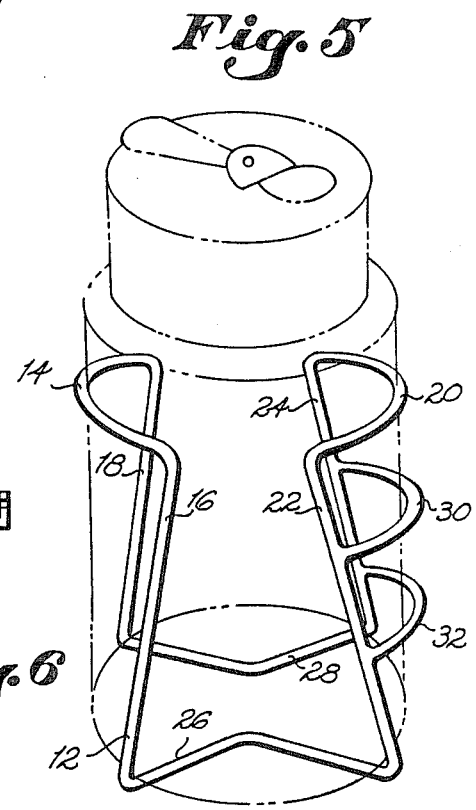
*Fig. 5*
*Fig. 6*
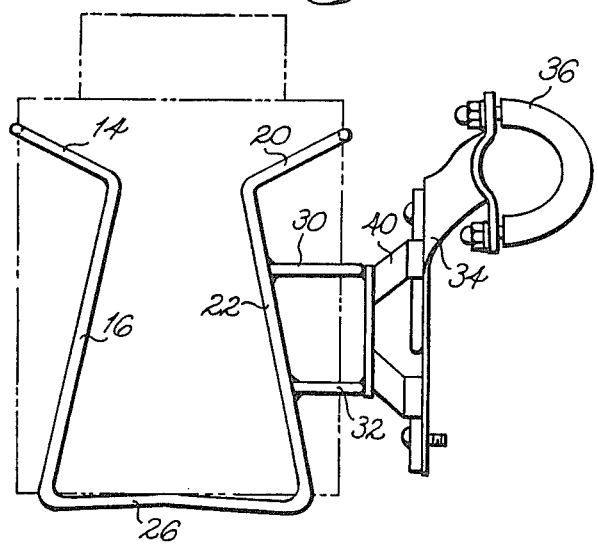
*Fig. 3*
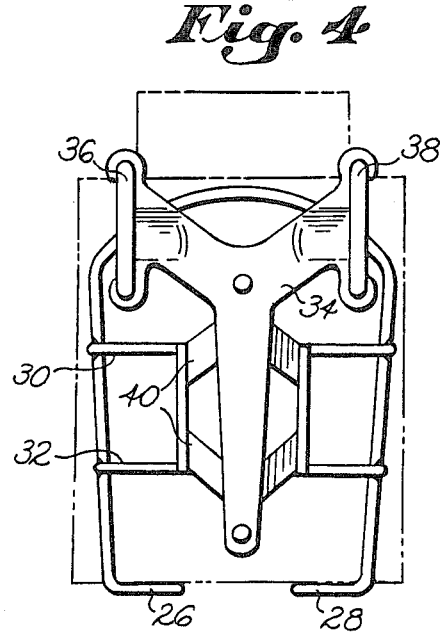
*Fig. 4*

BEVERAGE CADDY FOR BICYCLES

BACKGROUND OF THE INVENTION

1. Field of the Invention

This invention relates generally to a caddy for a beverage container, and more particularly to a caddy for an opened beverage container which can be mounted on the handle bars of a bicycle.

2. Description of Related Art

The basic structure of a bicycle provides support for little more than the rider. Consequently, a number of accessory devices are available which can be secured to the bicycle to carry various additional loads. One popular accessory is a device for carrying a beverage.

U.S. Pat. No. 4,009,810, Shook, entitled: "Water Bottle Cage", discloses a wire arrangement which can be secured to the bicycle frame for supporting a water bottle. As shown, and as typically used, this device is secured to a down tube. In this position, it is necessary that the water bottle be sealed to prevent loss of the water.

U.S. Pat. No. 4,256,281, Harris et al, entitled: "Cup Holding Apparatus", discloses a device which can be secured to the handle bars of a bicycle and which will hold a cup having downwardly converging walls.

U.S. Pat. No. 1,137,583, Cox, entitled: "Milk Bottle Holder", discloses a wire device for holding and protecting from the rain a milk bottle of the type rarely used today. This holder is designed to be fastened to a wall.

U.S. Pat. No. 4,324,381, Morris, entitled: "Beverage Container Support", discloses a support for a beverage container for use on a moving vehicle. It is designed to be fastened to a vertical wall and to pivot to offset forces due to motion.

None of the foregoing patents discloses a beverage container caddy for a bicycle useful for holding an open canned beverage container. Cold canned beverages are widely available at convenience stores and are preferred by many bicycle riders to the small amount of water contained in the typical bicycle water bottle. These cans are now primarily formed from aluminum and are easily dented and crushed.

One device which was observed was a plastic support having a circular band with a U-shaped base and a mounting below the base for securing it to a handle bar. This support was provided with an insulated cover which would receive an aluminum beverage can and would hold it upright above the handle bars.

It is therefore an object of this invention to provide a beverage container caddy which will hold the container in an upright position.

It is also an object of this invention to provide a beverage container caddy which will have a rugged metal structure and an appearance in keeping with other accessories for serious riders.

It is a further object of this invention to provide a beverage container caddy which will hold the container in front of the handle bars in a position which will not interfere with the rider.

It is also an object of this invention to provide a beverage container caddy which may be used with an insulated beverage container cover.

It is also an object of this invention to provide a beverage container caddy which permits ready removal and replacement of a beverage container while riding a bicycle.

DESCRIPTION OF THE DRAWINGS

FIG. 1 is a perspective view of the invention shown mounted on a bicycle handle bar;

FIG. 2 is a top plan view of a beverage container caddy in accordance with the invention;

FIG. 3 is a side elevation of the caddy of FIG. 2;

FIG. 4 is a rear elevation of the caddy of FIG. 2;

FIG. 5 is a perspective view of the cage portion of the caddy; and

FIG. 6 is a detail of an alternate support member.

SUMMARY OF THE INVENTION

A beverage container caddy for bicycles is formed of metal and designed to be secured to the handle bars. When so secured, the caddy will hold an open container, such as an aluminum can, in an upright position without crushing it. In one embodiment an insulated container cover may be used on the container. The container may be readily removed and returned to the caddy to permit consumption of the beverage from time to time.

DETAILED DESCRIPTION OF THE INVENTION

Referring to FIG. 1, beverage container caddy 10 is shown secured to the handle bars of a bicycle and containing a beverage container with an insulated cover. The use of an insulated cover is optional, but obviously retards the warming of a cold beverage in the container. It will be observed that the caddy is positioned in a convenient location for removing and replacing the beverage container so as to have a sip of the beverage, while also not intruding in the area where the rider's head may be positioned.

Referring to FIGS. 2-5, the caddy is composed of a cage portion 12, which is shown without any support arrangement in FIG. 5. Cage portion 12 has a front container restraint having a rearward facing arcuate portion 14, which is shown in FIG. 3 as also sloping downwardly. From the laterally disposed ends of arcuate portion 14 depend downwardly extending legs 16 and 18. Cage portion 12 also has a rear container restraint having a forward facing arcuate portion 20, which is shown in FIG. 3 as also sloping downwardly. From the laterally disposed ends of arcuate portion 20 depend downwardly extending legs 22 and 24. Leg 16 of the front container restraint and leg 22 of the rear container restraint are connected at the bottom by first base container support 26. Similarly, leg 18 of the front container restraint and leg 24 of the rear container restraint are connected at the bottom by second base container support 28.

As is most clearly shown in FIG. 2, front and rear arcuate portions 14 and 20 define a generally circular open center portion in which a container, or a container with a cover, may be placed. Base container supports 26 and 28 extend across the bottom of this generally circular open center portion so that a container will be supported at the bottom.

It is desirable that the caddy embrace the container, or container with cover, fairly snugly so as to prevent the container from bouncing out if the bicycle hits a bump. It is also desirable that front and rear arcuate portions 14 and 20 maintain their spacing because the aluminum containers frequently used for beverages are easily crushed. Consequently, the caddy is preferably fabricated from a material which will be substantially rigid. It may also be preferred to have a structure which can be painted to match other bicycle components or accessories, as well as being rugged. Additionally, depending legs 16, 18, 22 and 24 are preferably made long enough so that the vertical distance between the base container supports and the front and rear arcuate portions of the container restraints will be at least one-half the height of the container to be held.

In order that the caddy may be attached to a bicycle, upper and lower arcuate braces 30 and 32 are secured to legs 22 and 24. A single, wider brace may be substituted for braces 30 and 32. As is most clearly shown in FIG. 3, braces 30 and 32 do not need to function in the restraining of the container to be held in the caddy.

Secured to braces 30 and 32 is T-shaped support 34. The cross bars of the "T" hold in laterally spaced positions detachable curved links 36 and 38 which can be secured around the handle bars. These may be placed as shown in FIG. 1, both on one side of the head tube, or one link on either side of the head tube. In the latter arrangement, the cross bars of T-shaped support 34 may need a somewhat different configuration such as that shown in the detail of FIG. 6. T-shaped support 34 is secured to braces 30 and 32 by intermediate members 40 to provide a rigid structure.

The structure of this invention may be readily secured to the handle bars of a bicycle to hold an opened beverage container in an upright position. If it is desired that the container be held in an insulated cover, the diameter provided for the container will, accordingly be made larger. The structure may be formed from a heavy metal wire so as to be rugged and enable it to be painted to a desired color.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A beverage container caddy for fastening on the handle bars of bicycles comprising:
   a front container restraint having a rearward facing arcuate portion with laterally disposed ends;
   a downwardly and frontwardly extending leg depending from each of said laterally disposed ends of said front container restraint;
   a rear container restraint having a frontward facing arcuate portion with laterally disposed ends;
   a downwardly and rearwardly extending leg depending from each of said laterally disposed ends of said rear container restraint;
   all of said downwardly extending legs being substantially the same length;
   said front container restraint and said rear container restraint being spaced from each other so as to define a generally circular open center portion;
   a first base container support extending angular inwardly from the bottom end of one of said legs depending from said front container restraint and then extending angularly outwardly to the bottom end of one of said legs depending from said rear container restraint;
   a second base container support extending angularly inwardly from the bottom end of the other of said legs depending from said front container restraint and then extending angularly outwardly to the bottom end of the other of said legs depending from said rear container restraint;
   support means on said rear container restraint for connecting said container caddy to the handle bars of a bicycle;
   said support means including a T-shaped support having lateral arms; and
   a detachable curved link for connecting each of said lateral arms to the handle bars.

2. A beverage container caddy in accordance with claim 1 wherein:
   said base container supports extend across said generally circular open center portion.

3. A beverage container caddy in accordance with claim 1 wherein:
   the vertical distance between said base container supports and said front and rear arcuate portions of said container restraints is at least one-half the height of the container to be held.

4. A beverage container caddy in accordance with claim 1 further including:
   an arcuate brace connected between said legs of said rear container restraint; and
   said support means is secured to said arcuate brace.

5. A beverage container caddy in accordance with claim 1 wherein:
   said generally circular open center portion is large enough to accept a beverage container with an insulating cover about it.

6. A beverage container caddy in accordance with claim 1 wherein:
   said support means includes an arcuate brace connected between said legs of said rear container restraint; and
   said T-shaped support is secured to said arcuate brace by intermediate members.

7. A beverage container caddy for fastening on the handle bars of bicycles comprising:
   a cage having oppositely disposed front and rear beverage container restraints having arcuate portions defining a generally circular open center portion located to embrace opposite sides of the upper portion of a beverage container at the same height;
   said cage having legs depending from said arcuate portions of said oppositely disposed front and rear restraints;
   said legs depending from said front container restraint extending frontwardly, and said legs depending from said rear container restraint extending rearwardly;
   said cage also having base container supports extending between said depending legs of said oppositely disposed beverage container restraints at a location displaced vertically downward from said arcuate portions;
   said base container supports extending angularly inwardly from said legs depending from said front container restraint and then angularly outwardly to said legs depending from said rear container restraint;
   support means on said rear beverage container restraint for connecting said cage with a vertical orientation to the handle bars of a bicycle; and said support means attached to said cage intermediate said arcuate portion of said rear beverage container restraint and said base container support.

8. A beverage container caddy in accordance with claim 7 further including:
an arcuate brace connected to at least one of said beverage container restraints; and
said arcuate brace is the portion of said cage to which said support means is attached.

9. A beverage container caddy in accordance with claim 7 wherein:
said arcuate portions slope downwardly from the centers of said arcuate portions to the lateral ends of said arcuate portions; and
a leg descends from each lateral end to said base container support.

10. A beverage container caddy in accordance with claim 7 wherein: said cage is inflexible.

11. A beverage container caddy in accordance with claim 7 wherein:
said support means includes a T-shaped support having lateral arms; and
a detachable curved link for connecting to each of said lateral arms about the handle bars of a bicycle.

12. A beverage container caddy in accordance with claim 11 wherein:
said support means includes an arcuate brace connected to said cage between said arcuate portions of said container restraints and said base container support; and
said T-shaped support is secured to said arcuate brace.

13. A beverage container caddy for fastening on the handle bars of bicycles comprising:
a front container restraint having an rearward facing arcuate portion with laterally disposed ends;
a rear container restraint having an frontward facing arcuate portion with laterally disposed ends;
said arcuate portions sloping downwardly and inwardly from the centers of said arcuate portions to said laterally disposed ends;
a downwardly extending leg depending from each of said laterally disposed ends;
said legs depending from said front container restraint extending frontwardly, and said legs depending from said rear container restraint extending rearwardly;
all of said downwardly extending legs being substantially the same length;
said front container restraint and said rear container restraint being spaced from each other so that said arcuate portions define a generally circular open center portion;
a first base container support extending angularly inwardly from the bottom end of one of said legs depending from said front container restraint and then extending angularly outwardly to the bottom end of one of said legs depending from said rear container restraint;
a second base container support extending from the bottom end of the other of said legs depending from said front container restraint to the bottom end of the other of said legs depending from said rear container restraint; and
an arcuate brace connected between said legs of said rear container restraint;
a T-shaped support having lateral arms;
intermediate members securing said T-shaped support to said arcuate brace;
said arms of said T-shaped support extending rearwardly and upwardly from said intermediate members; and
a detachable curved link for connecting each of said arms of said T-shaped support to the handle bars of a bicycle.

* * * * *